Feb. 28, 1939.  S. BERGSTEIN  2,149,111
MACHINE FOR MAKING KNOCK-DOWN BOXES
Filed March 9, 1937  5 Sheets-Sheet 1
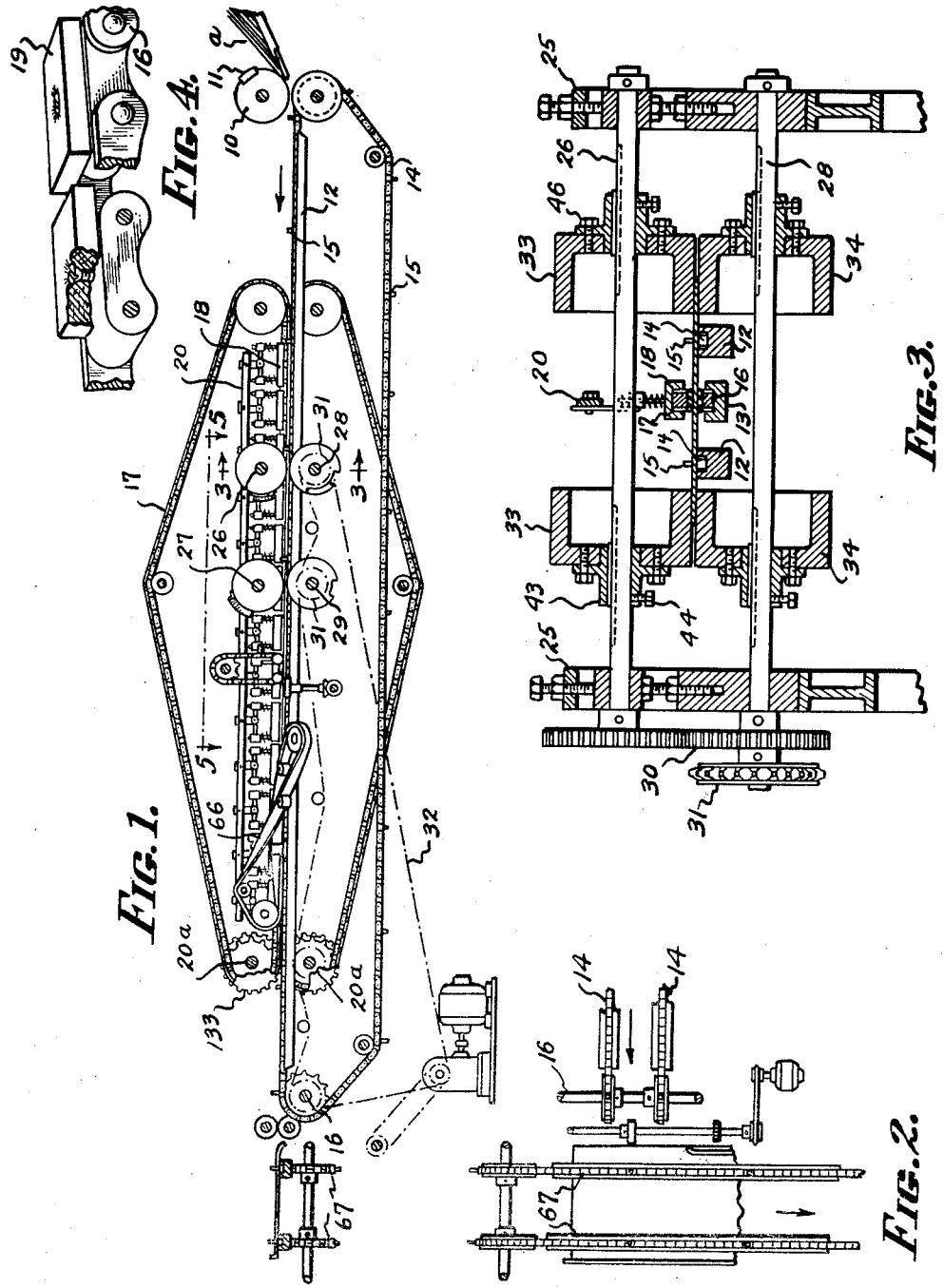
INVENTOR.
SAMUEL BERGSTEIN.
BY Allen & Allen
ATTORNEYS.

INVENTOR.
SAMUEL BERGSTEIN.
BY
Allen & Allen
ATTORNEYS.

Feb. 28, 1939. S. BERGSTEIN 2,149,111
MACHINE FOR MAKING KNOCK-DOWN BOXES
Filed March 9, 1937 5 Sheets-Sheet 3
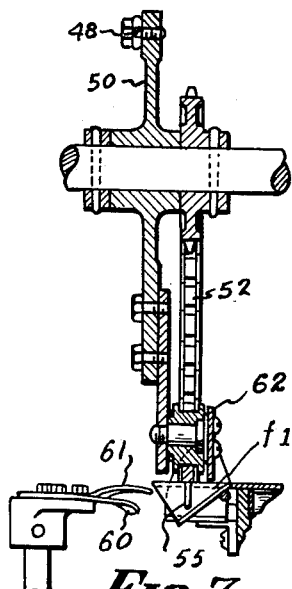
FIG. 7.
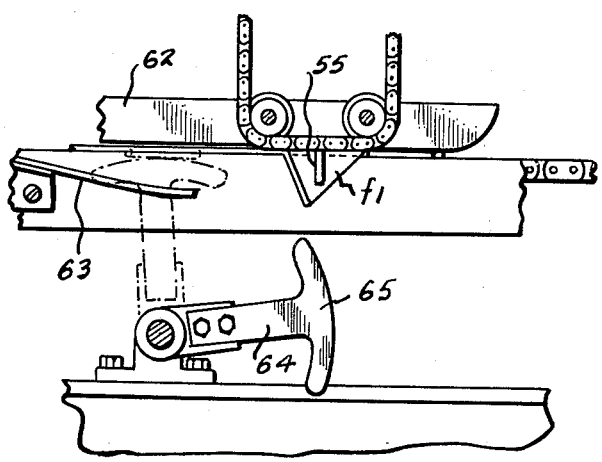
FIG. 8.
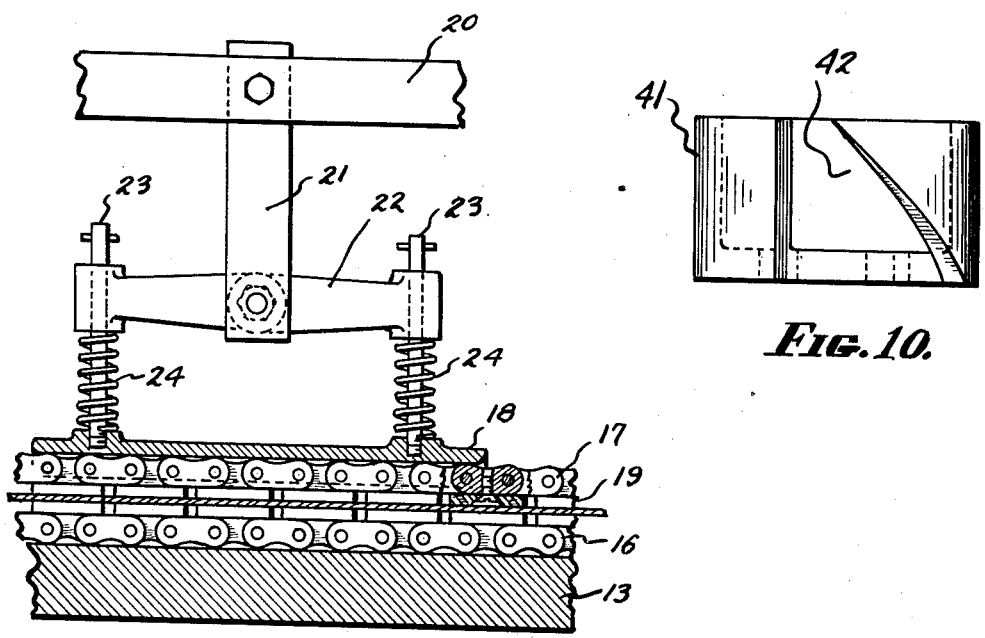
FIG. 9.
FIG. 10.
INVENTOR.
SAMUEL BERGSTEIN.
BY Allen & Allen
ATTORNEYS.

Feb. 28, 1939.   S. BERGSTEIN   2,149,111
MACHINE FOR MAKING KNOCK-DOWN BOXES
Filed March 9, 1937   5 Sheets-Sheet 4
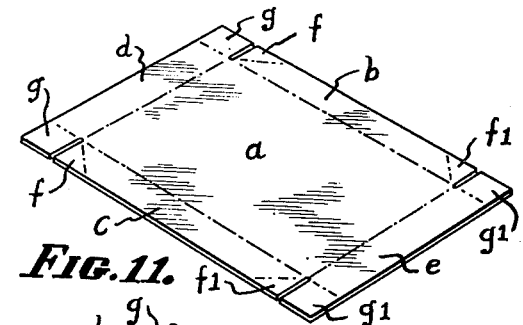
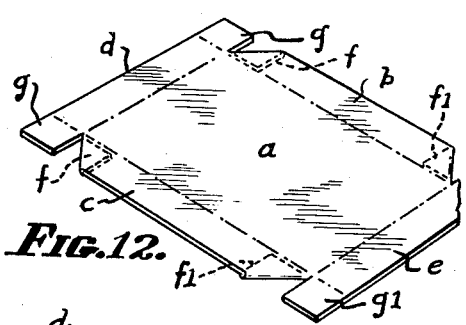
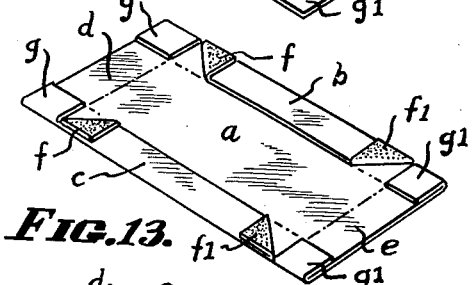
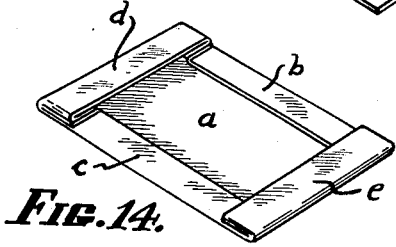
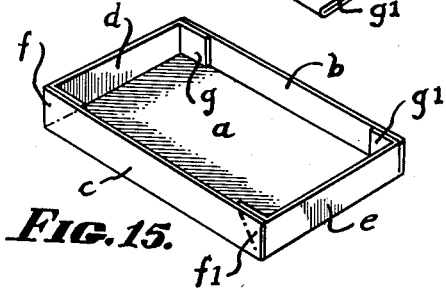
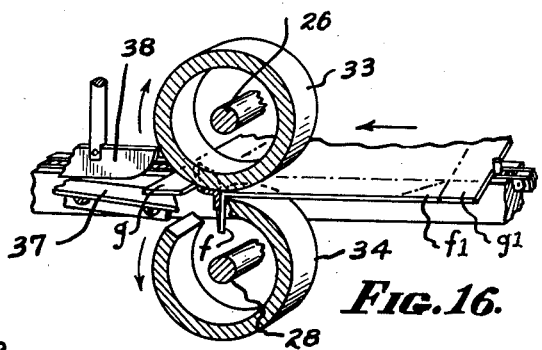
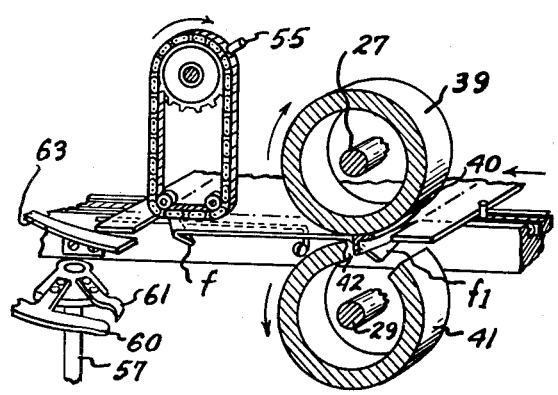
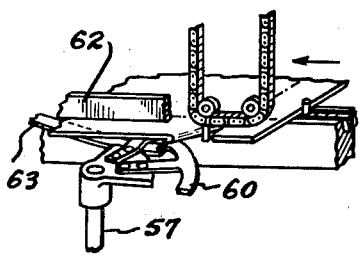
INVENTOR.
SAMUEL BERGSTEIN.
BY Allen & Allen
ATTORNEYS.

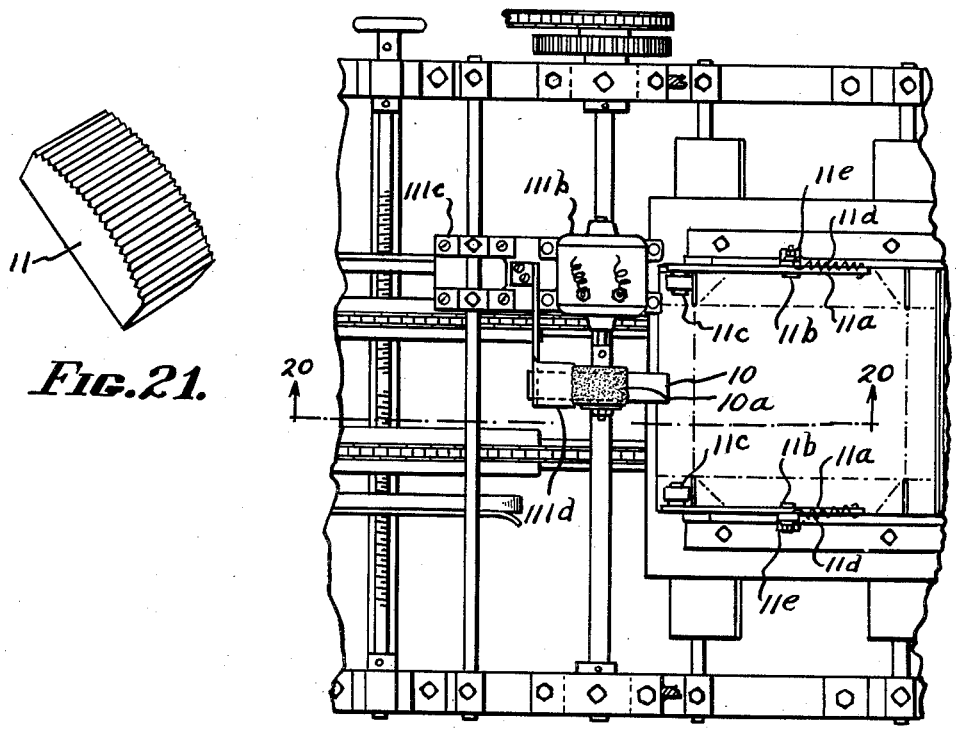
FIG. 21.
FIG. 19.
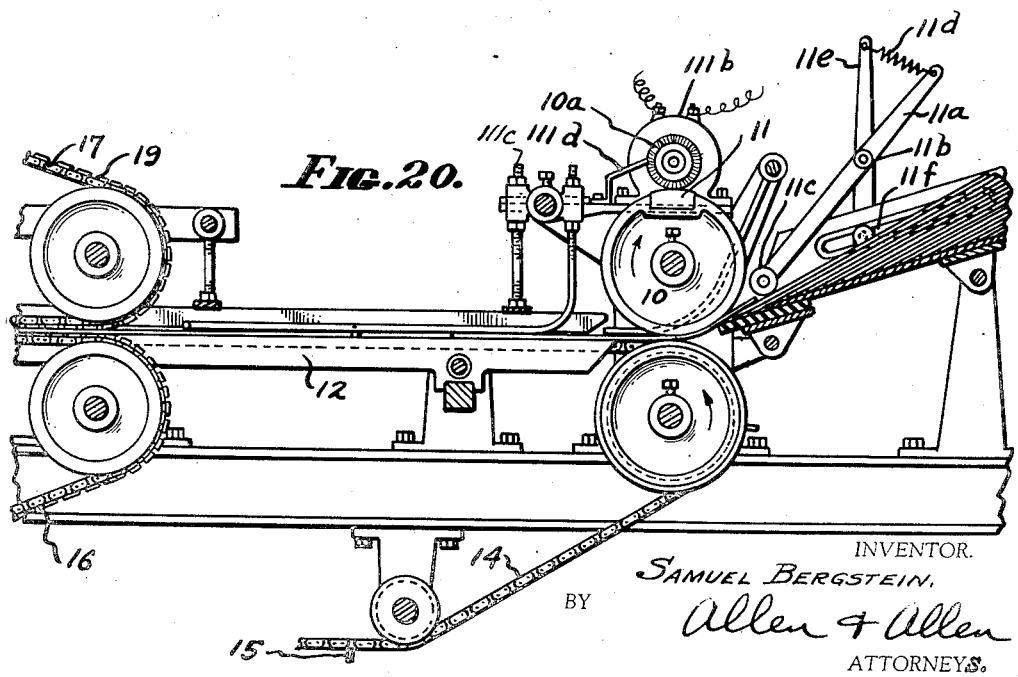
FIG. 20.
INVENTOR.
SAMUEL BERGSTEIN,
BY Allen & Allen
ATTORNEYS.

Patented Feb. 28, 1939

2,149,111

UNITED STATES PATENT OFFICE 2,149,111

MACHINE FOR MAKING KNOCK-DOWN BOXES

Samuel Bergstein, Cincinnati, Ohio, assignor to Edna May Bergstein and Robert Morris Bergstein, as trustees Application March 9, 1937, Serial No. 129,900

22 Claims. (Cl. 93—49)

My invention relates to a device for use in the manufacture of folding boxes in knock down form in which boxes the end walls thereof are provided with tabs which are adhesively joined to triangular tabs reversely folded from the ends of the side walls of the structure. The result of this is that when the box is set up the corner relation is such as to provide a support against collapse of the box corners after the box has been erected. In United States Letters Patent No. 1,926,364 granted to me on September 12, 1933, and No. 1,974,408 granted to me on Sept. 25, 1934, I have described methods of making such a knock down box; and the mechanism forming the basis of my present application is directed to improved devices for attaining the same end.

Consistent with the basic principle of providing the mechanism for carrying out the practice of my former patents above referred to, it is my object herein to provide a device using pocketed and ribbed wheels for engaging the intermediate diagonal flaps of a traveling blank, which of itself is not a novel folding mechanism, but I assure a more accurately timed series of blanks for engagement by the said wheels and a more positive engagement and feeding of the blanks while under the influence of the said wheels. It is also my object to so construct and operate the wheels as to fold the diagonal flaps downwardly instead of upwardly on the moving blank, and furthermore, to assure that the diagonal flap that is to be turned under the traveling blank in the direction of its motion through the machine will be positively depressed after having been originally deflected by the said wheels thereby to assure the operation of the sweeps which tuck the said flaps forwardly beneath the said traveling blanks. In connection with the operation of the said sweeps, it is my object to assure the accuracy of their operation by providing a finger against which they can be folded. By providing for these objects I am enabled to operate upon relatively stiff springy material and to do so without interruption of rapid travel of the blanks. I have, in connection with my novel device provided a device which assures a deflection of flaps in the carton blank which might otherwise interfere with individual feeding. Also I provide a device which improves the feeding of blanks from a hopper, by keeping the feeding pad free of lint, and an improved feed pad, with serrations thereon.

Stated from a method point of view I have provided a positive timed feed of blanks, have provided for initially breaking the score lines of triangular flaps lying within the confines of a moving blank, and thereafter for positively deflecting and turning forwardly and under of the trailing triangular flaps, all operations being performed on a moving blank. Furthermore, I provide for a practically positive engagement of the blanks during this motion and full support at the points where the deflection of the trailing triangular flaps are to be turned forward and under the moving blanks.

In the drawings:

Fig. 1 is a side elevation illustrating the complete mechanism involved.

Fig. 2 is a plan view indicating the second stage of the operation.

Fig. 3 is a section on the line 3—3 of Fig. 1.

Fig. 4 is a perspective detail of the hold down chain.

Fig. 7 is a detail elevation of the trailing triangular flap folder, taken on line 7—7 of Fig. 6.

Fig. 8 illustrates a modified device for that shown in Fig. 7.

Fig. 9 is a detail elevation partly in section of the chain hold down on line 9—9 of Fig. 5.

Fig. 10 is a detail of one of the pocketed wheels.

Figs. 11 to 15 are views of a blank in the stages of formation and in final erected form respectively.

Fig. 16 is a detail perspective of the operation of the pocketed and ribbed wheels applied to the forward or advancing triangular flaps.

Fig. 17 is a perspective view showing the operation of the wheels and final folding device as applied to the rear or trailing triangular flaps.

Fig. 18 is a view showing the action of the final folding devices.

Fig. 19 is a fragmentary plan view of the feed mechanism.

Fig. 20 is a section on the line 20—20 of Fig. 19.

Fig. 21 is a detail of the pad on the feed wheel.

Figure 5:
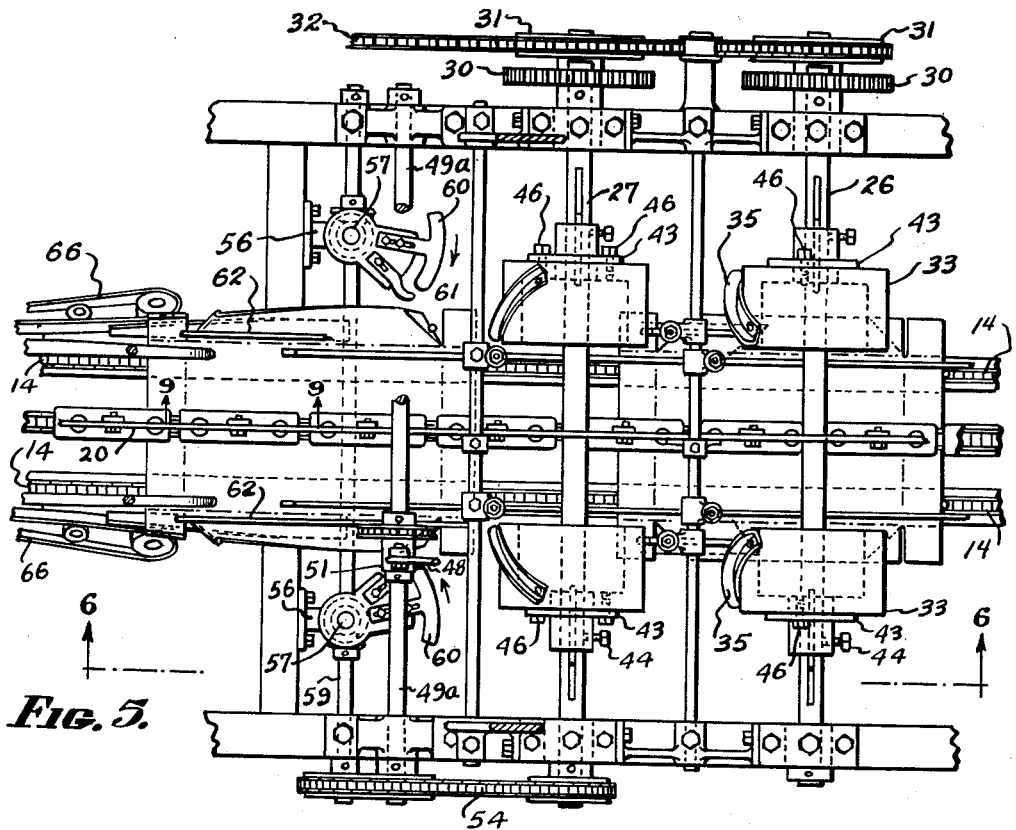
Fig. 5 is a plan view on a larger scale of the triangular or glue flap folding devices.

Referring first to Figs. 11 to 15, I will describe the carton blank to be operated upon and the several operative steps of the manufacture of the same into a collapsed container. The blank has a main body $a$, opposed side wall portion $b$ and $c$, articulated to the opposed edges of the body $a$, and defined therefrom by a score line. The blank has also opposed end wall portions $d$ and $e$, articulated to the other two side edges of the body $a$, and defined therefrom by score lines. The portions b and c I will refer to throughout the description as side wall portions, and the portions d and e as end wall portions, it being understood that the relative dimensions of the sides and ends are not important. It may be further noted that in the illustrated operation, the portions d and e form the front and rear of the blank as it is fed into the machine for the initial operations, and that the portions d and e are at the sides of the moving article in a subsequent stage of the operation. The side wall portions b and c of the blank are scored so that they terminate at their ends in triangular portions $f$, $f$ and $f^1$ $f^1$, which for convenience, I will refer to as such. Also the end walls d and e are scored to provide flaps $g$, $g$ and $g^1$, $g^1$, which flaps in the completed article are secured to the glue flaps by means of glue which may be deposited either on these corner flaps or on the glue flaps. Since the flaps $g$ and $g^1$ serve to reinforce the box when it is erected and hold the corners in erected position, I will refer to them as the reinforcing flaps.

In the operation to be described, the blank is fed in a direction with the end wall d leading and the end wall e trailing, and the first operation is to break the score lines defining the triangular portions and then to turn them under the moving blank, an operation which calls for turning the trailing triangular glue flaps $f^1$, $f^1$ forwardly of the movement of the blank. The resulting operation is illustrated in Fig. 12, it being significant that the glue flaps are folded back to engage the outside of the wall to which they are attached. By "outside" I mean the surface of the blank which is to be the outer surface of the finished box, and by "inside" I mean the surface which is to be the inside surface of the finished box. In passage through the machine, the outside surface of the blank is under, and the inside surface is upper.

The next stage in the operation is illustrated in Fig. 13, in which the flaps $g$ and $g^1$, i. e., the reinforcing flaps, are turned inwardly over the moving blank and the side walls b and c are also turned inwardly. This result in the triangular portions in their turned over condition lying uppermost of the moving blanks.

The blank in the folded condition shown in Fig. 13, is then preferably moved in a direction at right angles to its first movement, glue is applied either to the reinforcing flaps or the glue flaps and the end walls turned over and adhesively secured by this glue or other adhesive. The result is a knock down structure in flat form as illustrated in Fig. 14. The boxes are shipped in this shape.

As illustrated in Fig. 15, the operation of pulling outwardly on the end walls will be to erect the structure causing the reinforcing flaps to swing in and bear at least in part, on the main body a, or bottom of the box, and serve to hold the corners in erect position, in spite of the score lines defining the triangular flaps at the ends of the side walls.

Referring to Fig. 1, the blanks which I have marked a, are fed from a supply by means of a feed-wheel 10, having a friction pad 11, which advances the blanks one at a time.

It will be noted that the blanks have a series of flaps at each side and if in operation of manually deflecting these flaps preliminary to placing them in the machine is omitted the main lateral projections of the upper blank are likely to engage or catch on the advanced tabs of the blank beneath, as it is fed off. To obviate this, and facilitate a very rapid feed, I provide a pair of arms 11a, pivoted at 11b at each side of the supply table, these arms having rollers 11c which lie over the zone occupied by the flaps at each side of the blanks. These arms are depressed by springs 11d and the area beneath the rollers is free of any support so that the rollers will depress the flaps on the more advanced superposed blanks which depresses the advanced tabs of both the upper blank and the one beneath it and prevents any catching. The pivot 11b may be provided by a frame bar 11e adjustably mounted in slots 11f in the side frame of the supply table at each side.

Also I find that the friction pad, or pads, which are made of resilient material, such as rubber, grip more effectively if the surface thereof is provided with ridges or grooves, opposite the direction of travel, or crisscrossed in various directions.

However, if these depressions become filled with lint, the surface tends to become smooth and lose its frictional engaging qualities. Therefore to keep the surface of the feed pad, or pads, in maximum frictional-engaging condition, I have provided a buffing wheel 10a which engages the friction block, and is revolved by a small motor 111 on the spindle of which the wheel is mounted. A bracket 111c on one of the machine standards mounts the motor. Also a scraper blade 111d for the buffing wheel may be secured to the bracket or motor.

This simple device is decidedly advantageous in assuring rapid and regularly timed feeding of blanks.

The blanks are supported throughout their travel in the initial part of the machine by a pair of channeled bars 12 and for a portion at least of their travel, by an intermediate member mounted in a third channel 13. In the channel bars 12 are guided and supported the feed chains 14, which have feed pins 15 thereon, at spaced intervals, the feeding arrangement being such that a blank at a time is delivered to the feed chains and is then engaged by the pins and fed along through the several operations thereby. This assures an accurate spacing and timing of the blanks, a matter which is quite necessary because of the fact that the folding devices are initially applied to flaps lying inside of the front and rear terminal flaps of the blank, and hence must be very accurate. Before the blanks reach the devices which operate upon them, they are picked up and fed additionally, the object being to substitute a friction feed for an end-feed, thus assuring greater stability and avoiding the mutilation of the ends of the blanks with which the pins 15 engage.

Due to the peculiar nature of the said friction feed, it functions as a timed feed as well, as will be noted; a feature of radical difference over any belt and pulley feed of which I am informed.

This additional feeding mechanism has as its under member a chain 16, traveling in the channel bar 13 already noted, and has an upper member and chain 17 which travels in a series of channel bars 18. The chains 16 and 17 have friction pads 19 attached to their links, which friction pads grip the blank from both sides and hold it against any deflection while feeding it along. These chains are driven from sprockets 20a in time with the feed chains 14 (see Figs. 4 and 9). Thus there is no possible slippage of the friction device as would be the case of a feed belt of leather, rubber or fabric actuated by drums or pulleys. It acts in time with the folding devices and the pin chains and does not upon coming into engagement affect the timing of the blanks.

In Fig. 9 is shown in detail the mounting of the upper channels 18. On an intermediate frame member 20 are a series of bars 21, each of them mounting a retaining bar 22. Rods 23 journaled in bosses at the end of each crossbar are used to mount the channels 18. Springs 24 are mounted over the rods 23 between the bosses and the top of the channel. As a result the channels are spring pressed downwardly causing the pads 19 on the upper chain 17 to be pressed against the blanks as they move along, and holding them firmly down against the pads on the lower chain.

Secured in the side frames 25 of the machine are shafts 26 and 27, and mounted in the same side frames but below the level of the feeding chain are shafts 28 and 29. Gearing 30 from the shaft 28 drives the shaft 26 and like gearing from shaft 29 drives the shaft 27. There are sprockets 31 on the shafts 28 and 29, and a chain 32 common to the sprockets 16 for the driving chains, 20a for the lower positive feed chain and the two sprockets, 31 for the shafts 28 and 29, drive all of the several mechanisms in time with each other. The positive feed chain 17 has its sprocket 20a driven by gearing 133 from the sprocket for the lower positive feed chain.

The shaft 26 carries adjustably thereon a pair of ribbed wheels 33, and the shaft 28 carries a pair of pocketed wheels 34. The ribs on the wheels 33 are illustrated at 35, and the pockets on the wheels 34 are indicated at 36. The general direction of the ribs is such as to correspond to the diagonal score between the advancing glue flaps f of the blank, and hence the general direction of the ribs on the left-hand and right-hand wheels is divergent, the ribs matching the diagonal score lines on the two sides of the blanks.

The pockets in the lower wheels 34 have a slanting or spiral wall corresponding in direction to the direction of the rib on the upper and matching wheel on each side of the machine. The result is that as the blank passes between the two wheels the two forward flaps are folded down by the ribs into the pockets in the lower wheel. As illustrated in Fig. 16, when the two forward flaps have been turned downwardly and the blank advances, they immediately engage on each side of the machine an upwardly slanting plate 37 having a slanting forward edge and an upper pressure bar 38 which serve to fold the flaps f backwardly so that they underlie the advancing blank, by which time the blank has so advanced that it is coming into engagement with the second set of wheels. As in the first instance, there are a pair of upper wheels on the shaft 27, as indicated at 39, said wheels having angular or spiral ribs 40, and a pair of lower wheels 41 having pockets 42. Here again the ribs and the pocket wall are so arranged and the apparatus is so timed that the two trailing flaps $f^1$ are engaged and folded downwardly by the upper wheels into the pockets of the lower wheels, as in the instance of the forward flaps, f, without retarding the advancing movement of the blank. It should be noted as to the several wheels 33, 34, 39 and 41 that they are adjustably mounted on the several shafts by means of hubs 43 keyed to the shafts and controlled by set screws 44, the structure being common to all of the wheels. The wheels are adjustable in a rotary manner on the hubs, having slots 45 through the medium of which the wheels are bolted to the hubs by bolts 46.

As in the instance of the operation on the forward triangular flaps, the action of the ribbed and pocketed wheels is essentially to break the scores and initially depress the triangular flaps, but the problem of folding the rear flaps under and flush with the bottom of the blank is quite different, because all that was necessary with regard to the forward flaps was met with deflecting devices which were fixed, whereas the blank was moving. With regard to the trailing flaps $f^1$, it is necessary to fold them under by a mechanism travelling more rapidly than the blank, because they must be folded in the direction of movement of the blank. There are several things which must be provided for in order to rapidly and accurately accomplish this last noted folding operation, particularly if the board from which the blank is formed is fairly stiff. First the initially bent flaps $f^1$ will tend to spring back upwardly, therefore they must be pushed down again. In the second place the blank must be held against deflecting upwardly when the forward folding takes place, and in the third place, means should be provided to support the blank from beneath immediately adjacent the already broken score line to assure that the folding is accomplished at the score line alone. Various mechanical devices may be provided to accomplish this, of which I have shown a preferred form.

To provide a device for depressing the flaps ready to be swept forward, I employ the following mechanism:

On a cross-rod 47 of the frame I mount a pair of rods 48 by means of adjustable brackets 49, the adjustment being to allow for lateral spacing to correspond with the spacing of the ribbed and pocketed wheels. Mounted in the side frames of the machine is a rotary shaft 49a which passes through a pair of frames 50. Supported by the rods 48 on the shaft 49a are a pair of sprockets 51 adjusted so as to be adjacent to the frames 50. Chains 52 pass around the sprockets and beneath guides 53 at the lower ends of the frames which lower ends are above the surface of the moving blanks. On the opposite side of the machine from the driving side, a chain and a sprocket device indicated at 54 is employed to drive the shaft 49, and incidentally also to drive the sweeps which will next be described.

Figure 6:
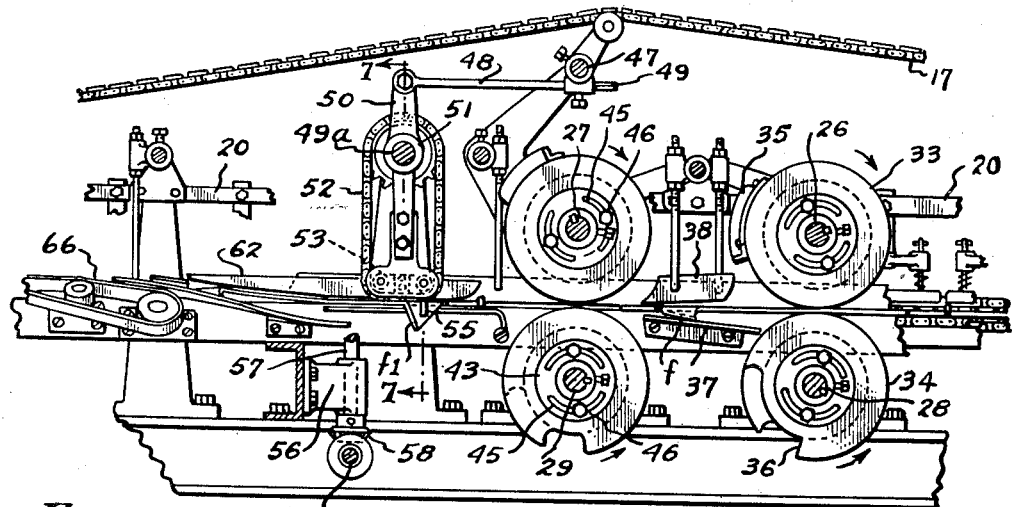
Fig. 6 is a side elevation of the same on line 6—6 of Fig. 5.

On each of the chains 52 is a pin 55 so located as to engage and push downwardly at the proper time on the initially bent flaps $f^1$ as the blank advances. Also due to the fact that the guides 53 for the lower end of the chains extend lengthwise of the machine a short distance, the pins 55 will travel along with the blank and hold the flaps $f^1$ extending substantially vertically downward, as illustrated in Figs. 6 and 7.

Located in bearings 56 at each side of the machine are vertical shafts 57 driven by beveled gears 58 from the chain and sprocket device 54 already noted, there being a cross shaft 59 from one bevel gear arrangement to the other on the opposite side of the machine, and the gears being so faced that the shafts 57, are rotated in opposite directions. On the upper end of each of the shafts 57 is a head carrying a sweep 60 and a supporting finger 61, located in advance of the sweep.

Located above the position of the sweeps and lying closely above the blank, are hold-down bars 62 which engage the inner margins of the walls of the advancing blank. Located beneath the blank and tapering upwardly from a position close to the line of operation of the sweeps, are supporting plates 63 which under-lie the inner margins of the said side flaps.

As so described, the operation is as follows:

The blank advances toward the sweeps with the flaps $f^1$ held in depressed position by the pins 55. The sweeps are timed so that the supporting fingers 61 first contact the under side of the blank adjacent the angular fold line of the said flaps. The sweeps 60 then strike the flaps and since the sweeps 60 are moving more rapidly than the advancing blank, they fold the flaps forward flush with the bottom of the blank. The hold-down bars 62 keep the blank from bending upwardly and the fingers 61 keep the blank from bending except at the score line. By the time the flaps have been turned under they ride over the bar 63 and the supporting fingers 61 and sweeps 60 continue their motion, swinging over the top of the supporting bars 63, with the result that the blank advances with the trailing flaps $f^1$ folded under.

A feature of the second set of wheels 39, 41 is that they engage and squeeze down the side edges of the blanks thus additionally securing the underfold of the forward triangular flaps.

As illustrating an alternative form of mechanism, instead of the sweeps swinging in a horizontal plane, they could swing in a vertical plane as illustrated in Fig. 8, in which the sweeps 64 have arcuate shaped heads 65 which engage the flaps $f^1$ held down by the pins 55, and fold them forwardly to overlie the supporting bar 63. It may be necessary in this arrangement to Fig. 8, to provide a second chain and pin device like the device 55, except that it operates in a horizontal plane and use this device to project a supporting finger beneath the advancing blank adjacent the score line on which the flap is to be folded, one of these devices at both sides of the machine.

As so far described the blank is in the form shown in Fig. 12, when it is passed through the operation, and the next operation which is also applied while the blanks are still being frictionaly and positively fed, is to fold the blank into the condition shown in Fig. 13. Any desired mechanism can be provided for this, of which the simplest is a pair of twist belts 66, there being no complication in connection with this operation, particularly as the folding operation turns upwardly and then over the blank, the entire laterally projecting structure on each side of the blank without the necessity of selecting any one portion to the exclusion of the other.

The next operation on the blank is to deliver it to the feed chains 67, which operate at right angles to the chains 14, and which carry the blank through the operation of applying adhesive, for example to the flaps $f$, $f$, $f^1$, $f^1$, and folding what will then be the lateral portions of the moving blank inward and over the glue flaps, resulting in a flat structure as illustrated in Fig. 14. Any ordinary gluing and folding apparatus can be utilized for this purpose.

The apparatus as above described, will operate with great rapidity and with complete assurance of accomplishing the complicated folding operations without distortion of the blanks. It will operate upon stiff and springy board and is comparatively simple to adjust and bring into accurately timed operation. As heretofore explained, the mechanism described is to a degree illustrative of mechanism which can be subject to a considerable modification without departing from the essence of the novel concepts embodied therein.

Also although it would require some modification of my mechanism to permit it to function to fold a blank as described in my Patent No. 1,974,408, the features of the present invention are applicable to such a method.

Having thus described my invention, what I claim as new and desire to secure by Letters Patent is:—

1. In a machine for making in flat knocked-down form a box of the type described, means for engaging a pair of angularly articulated portions on a moving blank, and initially depressing them along their line of articulation, means moving with the blank for subsequently retaining said portions in the depressed relation, means co-operating with the last means and moving more rapidly than the blank for folding the said flaps forwardly into underlying relation with the blank, and means for holding the portions in said position, all of said operations being performed on the moving blank.

2. In a machine for making in flat knocked-down form a box of the type described, means for engaging a pair of angularly articulated portions on a moving blank, and initially depressing them along their line of articulation, means for subsequently retaining said flaps in the depressed relation, means co-operating with the last means for folding the said portions forwardly into underlying relation with the blank, and means for holding the portions in said position, all of said operations being performed on the moving blank, said means for folding the portions forwardly including an element moving into and out of relation with the blank for supporting the margin thereof adjacent the line of articulation of the portions.

3. In a machine for making in flat knocked-down form a box of the type described, means for engaging a pair of angularly articulated portions on a moving blank, and initially depress them along their line of articulation, means for subsequently retaining said portions in the depressed relation, means for cooperating with the last means for folding the said portions forwardly into underlying relation with the blank, and means for holding the portions in said position, all of said operations being performed on the moving blank, said means for folding the portions forwardly including an element moving into and out of relation with the blank for supporting the margin thereof adjacent the line of articulation of the portions, and an element to hold the margin of the blank against upward deflection at the moment of said forward folding.

4. In a feeding device for blanks to move them in timed relation through a folding operation, the combination with an endless travelling feed element having aligned abutments to engage and space the blanks of a positive feeding device to hold the blank comprising an upper endless member and a lower endless member, each engaging the blanks, and travelling with it, said travelling members having friction faces thereon for engaging the blanks between the abutments on the feed element.

5. In a feeding device for blanks to move them in timed relation through a folding operation, the combination with an endless travelling feed element having aligned abutments to engage and space the blanks of a positive feeding device to hold the blank comprising an upper endless member and a lower endless member, each engaging the blanks, and travelling with it, said travelling members having friction faces thereon for engaging the blanks between the abutments on the feed element, and means for resiliently pressing the said members together where they engage the blank.

6. In a feeding device for blanks to move them in timed relation through a folding operation, the combination with an endless travelling feed element having aligned abutments to engage and space the blanks of a positive feeding device to hold the blank comprising an upper endless member and a lower endless member, each engaging the blanks, and traveling with it, said traveling members having friction faces thereon for engaging the blanks between the abutments on the feed element, and means for resiliently pressing the said members together where they engage the blank, said means comprising channeled guides in which the one member travels, and means including springs whereby said channeled guides are mounted.

7. That method of forming a box of the character described which consists in feeding a series of said blanks in timed relation, initially depressing triangular portions at the lateral margins of the blanks but removed from the forward and rearward edges thereof, and thereafter folding the said portions against the outside of the walls of which they form a part, the operation of doing so with the rearward triangular portions being accompanied by a further depression and holding in depressed relation of the said portions applied between the initial depression thereof and the ultimate folding thereof.

8. That method of forming a box of the character described which consists in feeding a series of said blanks in timed relation, initially depressing triangular portions at the lateral margins of the blanks but removed from the forward and rearward edges thereof, and thereafter folding the said portions into underlying relation with the margins of the blanks, the operation of doing so with the rearward portions being accompanied by a further depression and holding in depressed relation of the said portions, and thereafter folding over the margins of the blanks at both sides without disturbing the folded relation of the said portions.

9. In a machine for making knocked-down boxes of the character described, means for moving a blank along, and moving means to support the extending walls on the outside adjacent the angular lines of fold therein and moving means operating therewith to fold the rearward triangular marginal portions of said walls against the outside surface of said walls to which said triangular marginal portions are articulated.

10. In a machine for making knocked-down boxes of the character described, means for moving a blank along, and moving means to support the extending walls on the outside and moving means operating therewith to fold the rearward triangular marginal portions of said walls against the outside surface of said walls to which said triangular marginal portions are articulated, and other cooperating means on the opposite surface of said walls to support said walls from opposite side and thereby preventing deflection of said walls in either direction, while said triangular marginal portions thereof are being folded.

11. A device for folding forward triangular marginal portions of a moving blank to a position folded against the outside of the walls to which they are attached which comprises means for engaging said portions and folding them back and supporting bars onto which the said marginal portions move immediately upon being folded, said bars having their forward edges angled in the direction of the fold line of said marginal portions.

12. In a machine for making in flat knock down form boxes of the type described, aligning means for moving the blanks in timed relation by abutment therewith, additional positively timed frictionally surfaced moving means engaging surfaces of the blanks without destroying the timed relation, and means operative on the margins of the blank for turning under the blank at forward and rearward triangular portions angularly articulated to said margins, said means operating while the blank is in motion and under the influence of the frictionally engaging moving means.

13. In a machine for making in flat knock down form boxes of the type described, aligning means for moving the blanks in timed relation by abutment therewith, additional positively timed frictionally surfaced moving means engaging surfaces of the blanks without destroying the timed relation, and means operative on the margins of the blank for turning under the blank at forward and rearward triangular portions angularly articulated to said margins, said means operating while the blank is in motion and under the influence of the frictionally engaging moving means, and said portions being located entirely within the boundaries of the forward and rearward panels in the direction of motion.

14. In a machine for making in flat knock down form boxes of the type described, aligning means for moving the blanks in timed relation by abutment therewith, additional positively timed frictionally surfaced moving means engaging surfaces of the blanks without destroying the timed relation, and means operative on the margins of the blank for turning under the blank at forward and rearward triangular portions angularly articulated to said margins, said means operating while the blank is in motion and under the influence of the frictionally engaging moving means, and said portions being located entirely within the boundaries of the forward and rearward panels in the direction of motion, and means thereafter to fold the entire lateral margins of the blanks inwardly into overlying relation on the blank.

15. In a machine for making in flat knock down form boxes of the type described, aligning means for moving the blanks in timed relation by abutment therewith, additional positively timed frictionally surfaced moving means engaging surfaces of the blanks without destroying the timed relation, and means operative on the margins of the blank for turning under the blank at forward and rearward triangular portions angularly articulated to said margins, said means operating while the blank is in motion and under the influence of the frictionally engaging moving means, said turning means comprising opposed ribbed and pocketed wheels operating on the blank to accomplish an initial depression of the said portions, one set of wheels for each flap.

16. In a machine for making in flat knock down form boxes of the type described, aligning means for moving the blanks in timed relation by abutment therewith, additional positively timed frictionally surfaced moving means engaging surfaces of the blanks without destroying the timed relation, and means operative on the margins of the blank for turning under the blank at forward and rearward triangular portions angularly articulated to said margins, said means operating while the blank is in motion and under the influence of the frictionally engaging moving means, said turning means comprising opposed ribbed and pocketed wheels operating on the blank to accomplish an initial depression of the said portions, one set of wheels for each portion, and means operating adjacent the wheels for engaging and completing the folding of the said portions.

17. In a machine for moving blanks in timed relation through a folding operation along their lateral margins, chains having aligned abutments for engaging the rear edges of the blanks, and additional positively timed moving means to engage opposite surfaces of the blanks by friction, comprising endless frictionally faced members.

18. In a machine for moving blanks in timed relation through a folding operation along their lateral margins, chains having aligned abutments for engaging the rear edges of the blanks, and additional positively timed moving means to engage opposite surfaces of the blanks by friction, comprising endless frictionally faced members, said additional device operating along the central zone of the blank, between the feed chains.

19. In a machine for moving blanks in timed relation through a folding operation along their lateral margins, chains having aligned abutments for engaging the rear edges of the blanks, and additional positively timed moving means to engage opposite surfaces of the blanks by friction, comprising endless frictionally faced members, comprising a positively driven upper endless member and lower endless member, each engaging the blanks, and traveling with it.

20. In a machine for moving blanks in timed relation through a folding operation along their lateral margins, chains having aligned abutments for engaging the rear edges of the blanks, and additional positively timed moving means to engage opposite surfaces of the blanks by friction, comprising endless frictionally faced members, comprising an upper endless member and a lower endless member, each engaging the blanks and traveling with it, said endless members having friction faces thereon for engaging the blanks, said upper and lower members being chains and sprockets to drive the same in timed relation to the traveling feed element, the said friction faces being formed on the links of said chains.

21. In a machine for moving blanks in timed relation through a folding operation along their lateral margins, chains having aligned abutments for engaging the rear edges of the blanks, and additional positively timed moving means to engage opposite surfaces of the blanks by friction, comprising endless frictionally faced members, and means for resiliently pressing the said members together where they engage the blanks, said upper and lower members having chains and sprockets to drive the same in timed relation to the traveling feed element, the said friction faces being formed on the links of said chains.

22. A device for folding rearward triangular marginal portions of a series of moving blanks at spaced intervals, to a position folded against the outside of the walls to which they are attached, which comprises a combined supporting member and a folding member, synchronized to said intervals, but moving at a rate of speed greater than that of said blanks.

SAMUEL BERGSTEIN.